(12) United States Patent
Baumgart et al.

(10) Patent No.: US 7,933,085 B2
(45) Date of Patent: Apr. 26, 2011

(54) HEAD SPACING VERIFICATION IN MAGNETIC DISK DRIVE SYSTEMS DURING END-USER OPERATION

(75) Inventors: Peter M. Baumgart, San Jose, CA (US); Erhard T. Schreck, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 330 days.

(21) Appl. No.: 12/059,995

(22) Filed: Mar. 31, 2008

(65) Prior Publication Data

US 2009/0244752 A1 Oct. 1, 2009

(51) Int. Cl.
*G11B 27/36* (2006.01)
*G11B 21/02* (2006.01)
(52) U.S. Cl. ........................................... 360/31; 360/75
(58) Field of Classification Search .................. None
See application file for complete search history.

(56) References Cited

U.S. PATENT DOCUMENTS

| | | | |
|---|---|---|---|
| 6,008,640 A | 12/1999 | Tan et al. | |
| 7,126,777 B2 | 10/2006 | Flechsig et al. | |
| 7,180,692 B1 | 2/2007 | Che et al. | |
| 7,190,547 B2 | 3/2007 | Khurshudov et al. | |
| 7,215,495 B1 | 5/2007 | Che et al. | |
| 7,239,471 B2 | 7/2007 | Tanabe | |
| 7,633,696 B2 * | 12/2009 | Kassab | 360/31 |
| 2006/0119974 A1 | 6/2006 | Yamazaki et al. | |
| 2006/0268445 A1 | 11/2006 | Brannon et al. | |
| 2007/0064332 A1 | 3/2007 | Higashiya | |
| 2007/0133118 A1 | 6/2007 | Kajitani | |
| 2007/0217051 A1 | 9/2007 | Shen et al. | |

OTHER PUBLICATIONS

Miyake et al., "Optimized Design of Heaters for Flying Height Adjustment to Preserve Performance and Reliability", IEEE Transactions on Magnetics, vol. 43, No. 6, pp. 2235-2237 (Jun. 2007).

* cited by examiner

*Primary Examiner* — Daniell L Negrón
(74) *Attorney, Agent, or Firm* — Duft Bornsen & Fishman, LLP

(57) ABSTRACT

Magnetic disk drive systems and associated methods are described for verifying a spacing between read/write heads on a slider and a magnetic recording disk during end-user operation. An operating power applied to heating elements in the slider controls the spacing due to thermal protrusion. While in end-user operation, the operating power is temporarily increased to a test power to decrease the spacing. The test power is then evaluated to determine if contact between the read/write heads and the magnetic recording disk is detected. If contact is not detected, then the spacing due to the operating power is determined to be adequate. If contact is detected, then the operating power is recalibrated.

18 Claims, 5 Drawing Sheets

HEAD SPACING VERIFICATION IN MAGNETIC DISK DRIVE SYSTEMS DURING END-USER OPERATION

BACKGROUND OF THE INVENTION

1. Field of the Invention

The invention is related to the field of magnetic disk drive systems and, in particular, for verification of the spacing between read/write heads and a magnetic recording disk within a magnetic disk drive system while in end-user operation.

2. Statement of the Problem

Many computer systems use magnetic disk drive systems for mass storage of information. Magnetic disk drive systems typically include one or more sliders that include a read head and a write head. An actuator/suspension arm applies a slight spring force to position the slider proximate to a magnetic recording disk. The side of the slider facing the magnetic recording disk is called an Air Bearing Surface (ABS). When the magnetic recording disk rotates, air flow generated by the rotation creates an air bearing between the slider ABS and the magnetic recording disk. This air bearing causes the ABS of the slider to fly at a particular height above the magnetic recording disk, which is also called the fly height. As the slider flies on the air bearing, a voice coil motor moves the actuator/suspension arm in a radial direction along the surface of the magnetic recording disk. This radial movement allows positioning of the slider over selected tracks of the magnetic recording disk to allow reading and writing of data by the read/write heads.

One factor that contributes to the effective reading and writing of data by the read/write heads is the spacing of the read/write heads in relation to the surface of the magnetic recording disk. This spacing generally depends on the fly height of the slider, which is determined by the ABS of the slider. As areal densities of magnetic recording disks increase, it becomes more important to precisely control the spacing of the read/write heads in relation to the magnetic recording disk, as the spacing may be 10 nanometers or less.

To further control the spacing between the read/write heads and the magnetic recording disk, some sliders include heating elements which are fabricated proximate to the read/write heads. The read/write heads are fabricated from materials that have a different thermal rate of expansion than the body of the slider. When a current is applied to the heating elements, the read/write heads protrude from the ABS of the slider towards the surface of the magnetic recording disk. This protrusion reduces the spacing between the read/write heads and the magnetic recording disk. The use of heating elements, which is also referred to as thermal fly height control, allows for a more precise control of the spacing between the read/write heads and the magnetic recording disk.

After manufacturing, but before being shipped to an end-user, a magnetic disk drive system is calibrated to generate a desired spacing between the read/write heads and the magnetic recording disk. To calibrate a magnetic disk drive system, a control system applies a motor current to a spindle motor which in turn rotates a spindle connected to the magnetic recording disk. As the magnetic recording disk rotates, the slider flies over the surface of the magnetic recording disk on the air bearing. A thermal fly height controller then incrementally increases the heating power applied to the heating elements in the slider in order to increase the protrusion of the read/write heads towards the surface of the magnetic recording disk. At some threshold of heating power applied to the heating elements in the slider (herein referred to as the contact power), the read/write heads will contact the surface of the magnetic recording disk. Based on the spacing due to the contact power and the spacing without heating power applied, a relationship may be determined between the heating power and the spacing between the read/write heads and the magnetic recording disk. Magnetic disk drive system manufacturers may then use this relationship to define an operating power applied to the heating elements which results in the desired spacing between the read/write heads and the magnetic recording disk. For example, if the spacing between the read/write heads and the magnetic recording disk without any heating power applied is 10 nanometers (nm), and the calibration process determines that the contact power applied to reduce the spacing to zero is 100 milliwatts (mW), this would yield a relationship of 10 mW/nm (assuming a substantially linear relationship). In order to generate a desired spacing of 6 nm, an operating power of 40 mW would be applied to the heating elements in the slider to cause a 4 nm thermal protrusion of the read/write heads towards the magnetic recording disk.

After calibration, the magnetic disk drive system is shipped to an end-user. When in end-user operation, the magnetic disk drive system uses the operating power to generate the desired spacing between the read/write heads and the magnetic recording disk. As the drive ages, and due to changes in environmental conditions, the operating power applied may be inadequate to generate the desired spacing, which may lead to reduced performance or potential drive failure due to head to disk contact. Head to disk contact occurs when the spacing between the read/write heads and the magnetic recording disk is reduced until the ABS of the read/write heads contact the magnetic recording disk. Head to disk contact is undesirable, as it may cause damage to the slider or to the magnetic recording disk.

SUMMARY OF THE INVENTION

Embodiments of the invention operate to periodically investigate the spacing between the read/write heads on the slider and the magnetic recording disk while the magnetic disk drive system is in end-user operation. This investigation entails periodically probing the spacing due to the operating power applied to the heating elements by temporarily increasing the operating power to reduce the spacing. When the spacing is reduced, head to disk contact is evaluated to determine if the spacing due to the operating power is adequate. If the spacing is not adequate, then the operating power is recalibrated.

In one embodiment of the invention, a method of verifying the spacing between read/write heads on a slider and a magnetic recording disk is disclosed. A slider, using thermal protrusion for altering the spacing between read/write heads and a magnetic recording disk, is in end-user operation. A heating power is increased from an operating power to a test power to temporarily reduce the spacing. The test power is estimated to avoid contact under normal circumstances. For example, if the operating spacing is expected to be about 6 nm, then a test power is estimated to temporarily reduce the spacing to about 3 nm. This estimated non-contact probing of spacing can be much more frequent than intentional full-contact probing, since non-contact probing avoids the stress and wear of the read/write heads due to contact with the magnetic recording disk.

After the increase in power, a determination is made if the test power causes contact between the read/write heads and the magnetic recording disk. If no contact is detected, then the spacing due to the operating power is determined to be adequate. If contact is detected, then the operating power is recalibrated.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
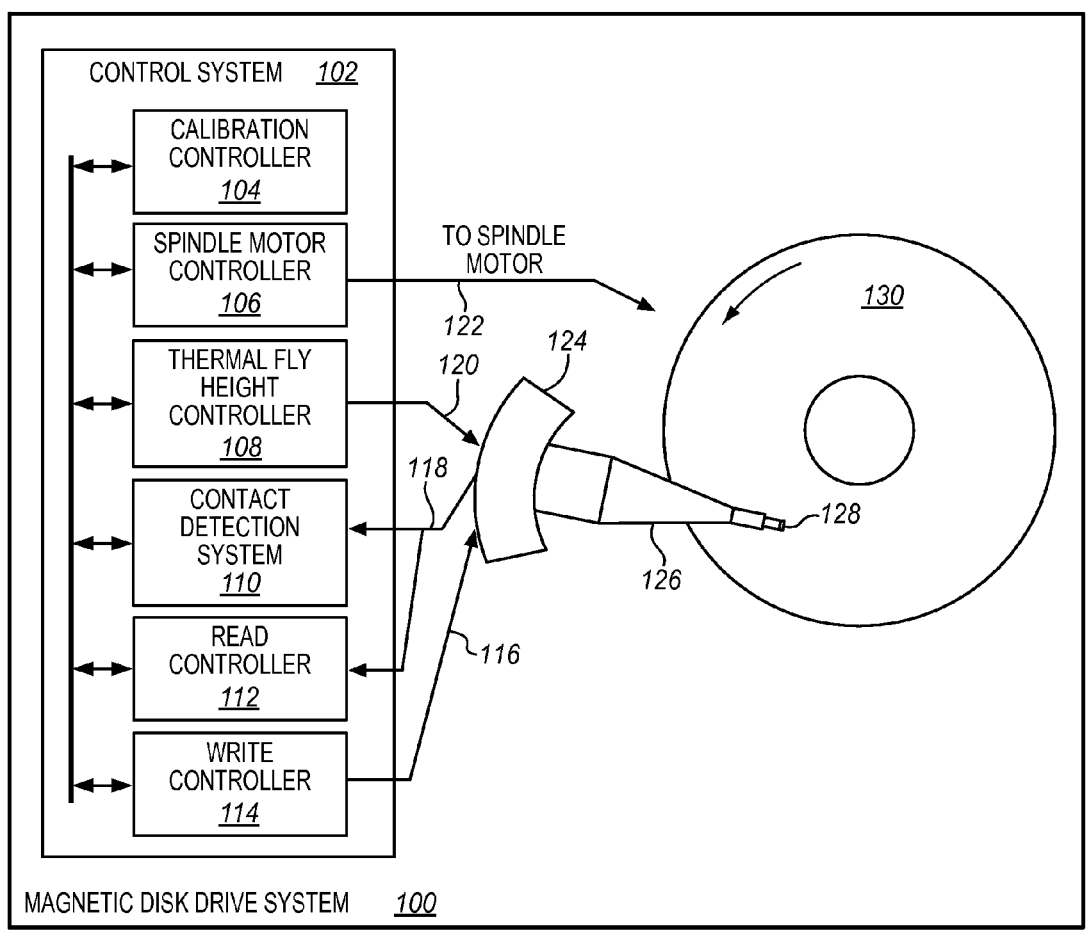
FIG. 1 is a top view of the magnetic recording disk drive system in an exemplary embodiment of the invention.

FIG. 1 is a top view of magnetic disk drive system 100 in an exemplary embodiment of the invention. In this view, magnetic disk drive system 100 further includes a control system 102. Control system 102 includes a calibration controller 104 that is adapted to recalibrate the operating power. Control system 102 further includes a spindle motor controller 106 that is adapted to apply a motor current 122 to a spindle motor, which controls the rotational speed of magnetic recording disk 130. Control system 102 also includes a thermal fly height controller 108 that is adapted to apply a heating power 120 to the heating elements (not shown) in slider 128 in order to control the amount of protrusion of the read/write heads towards magnetic recording disk 130.

Control system 102 further includes contact detection system 110 that is adapted to detect when slider 128 contacts magnetic recording disk 130. Contact detection system 110 may be implemented in hardware, software, firmware, or any combination thereof to provide the desired operation. In order to detect the contact, contact detection system 110 receives read data 118 from magnetic recording disk 130, and is also adapted to receive other information. For example, read data 118 from magnetic recording disk 130 may comprise servo data that is read from servo fields on magnetic recording disk 130. Read data 118 may also include the measurement of thermal asperities (read signal spikes caused by a read sensor temperature rise during head to disk contact), frequency modulation of the read signal (caused by side to side slider oscillation in a data track), or data from sensing the physical vibration of slider 128.

Control system 102 further includes read controller 112 that is adapted to receive read data 118 from magnetic recording disk 130 and to determine the quality of read data 118. Control system 102 also includes write controller 114 that is adapted to send write data 116 to magnetic recording disk 130, and to write a known test pattern or other generic data to magnetic recording disk 130.

When magnetic recording disk 130 rotates, an air flow generated by the rotation of magnetic recording disk 130 causes an air bearing surface (ABS) of slider 128 to fly on a cushion of air at a particular height above magnetic recording disk 130. As slider 128 flies over the surface of magnetic recording disk 130, a voice coil motor 124 moves actuator/suspension arm 126 to position a read head (not shown) and a write head (not shown) in slider 128 over selected tracks of magnetic recording disk 130.

Figure 2:
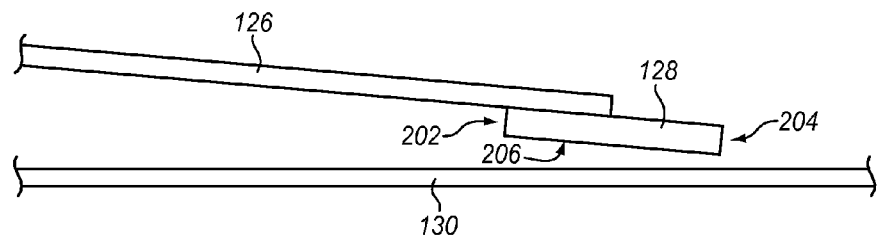
FIGS. 2-5 are side views of a slider in relation to a magnetic recording disk in an exemplary embodiment of the invention.

FIG. 2 is a side view of a slider 128 in relation to magnetic recording disk 130 in an exemplary embodiment of the invention. Slider 128 is supported above the surface of magnetic recording disk 130 by actuator/suspension arm 126. Slider 128 includes a front end 202 and an opposing trailing end 204. Slider 128 also includes an air bearing surface 206 that faces toward the surface of magnetic recording disk 130. A read head (not shown) and a write head (not shown) are formed proximate to the trailing end 204. Slider 128 also includes one or more heating elements (not shown) that are fabricated in slider 128 proximate to the read/write heads. The read/write heads are fabricated from materials that have a different thermal rate of expansion than the body of slider 128. Thus, when a heating power is applied to the heating elements, the read/write heads protrude from the ABS 206 of slider 128. This protrusion causes the read/write heads to extend toward the surface of magnetic recording disk 130, which reduces the spacing between the read/write heads and magnetic recording disk 130. The use of heating elements (which is also referred to as thermal fly height control), allows for more precise spacing between the read/write heads and magnetic recording disk 130.

Figure 3:
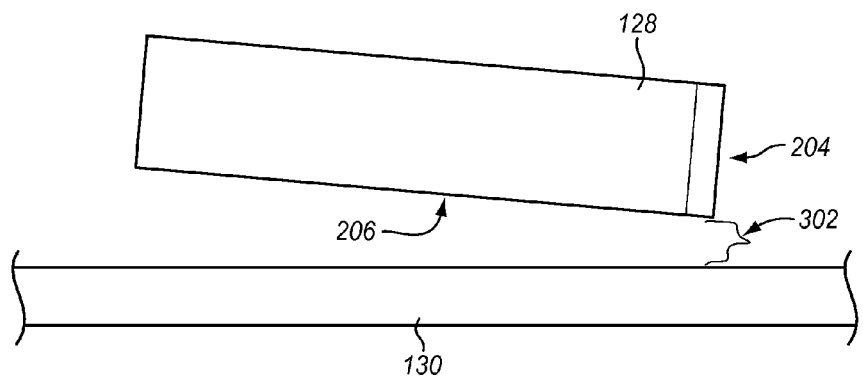

FIG. 3 is a side view of slider 128 in relation to magnetic recording disk 130. When heating power is not applied to the heating elements in slider 128, the spacing 302 between read/write heads and magnetic recording disk 130 is defined by the ABS 206 of slider 128. When a heating power is applied, the heating elements cause the read/write heads to protrude from the ABS 206 toward the surface of magnetic recording disk 130.

Figure 4:
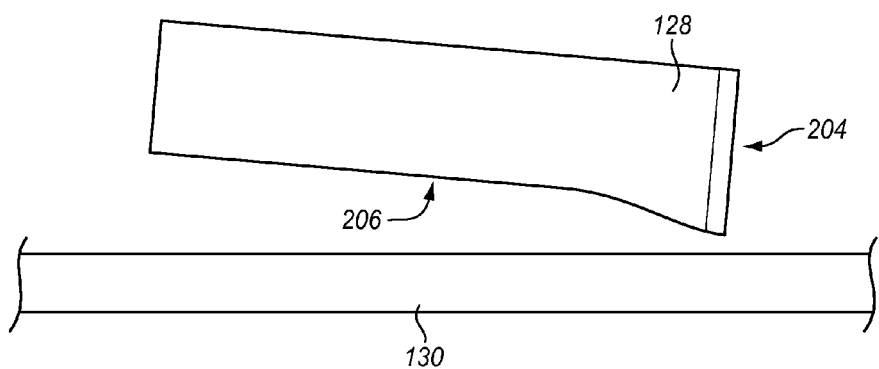

FIG. 4 is another side view of slider 128 in relation to magnetic recording disk 130. Due to the protrusion of the read/write heads, the spacing between the read/write heads and the surface of magnetic recording disk 130 is reduced. Thus, the spacing can be controlled by the amount of heating power applied to the heating elements in slider 128.

Before magnetic disk drive system 100 is put into operation, it is calibrated by the manufacturer. To calibrate magnetic disk drive system 100, a heating power is applied to the heating elements in slider 128 and is increased incrementally until the read/write heads contact the surface of magnetic recording disk 130. Based on the spacing due to the contact power and the spacing without heating power applied, a relationship may be determined between a heating power and the spacing between the read/write heads and magnetic recording disk 130. Magnetic disk drive system manufacturers may then use this relationship to define an operating power applied to the heating elements which results in a desired spacing between the read/write heads and the magnetic recording disk, which is also referred to as a calibrated spacing.

Figure 5:
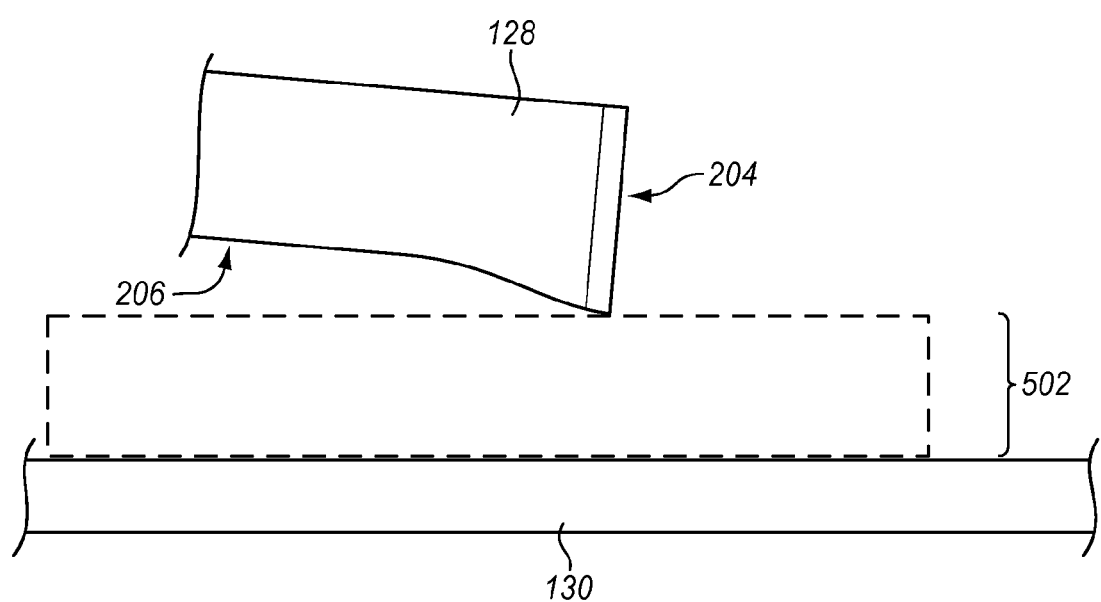

FIG. 5 is another side view of slider 128 in relation to magnetic recording disk 130. When magnetic disk drive system 100 is put into end-user operation, thermal fly height controller 108 (see FIG. 1) applies the operating power to the heating elements. The operating power applied to the heating elements of slider 128 causes a thermal protrusion towards magnetic recording disk 130, and generates calibrated spacing 502 between the read/write heads and the magnetic recording disk 130. Calibrated spacing 502 may unintentionally change over time while in end-user operation due to a number of factors, including drive age, temperature, atmospheric pressure, or humidity. Thus, it would be desirable to verify that calibrated spacing 502 is adequate even under changing conditions.

Figure 6:
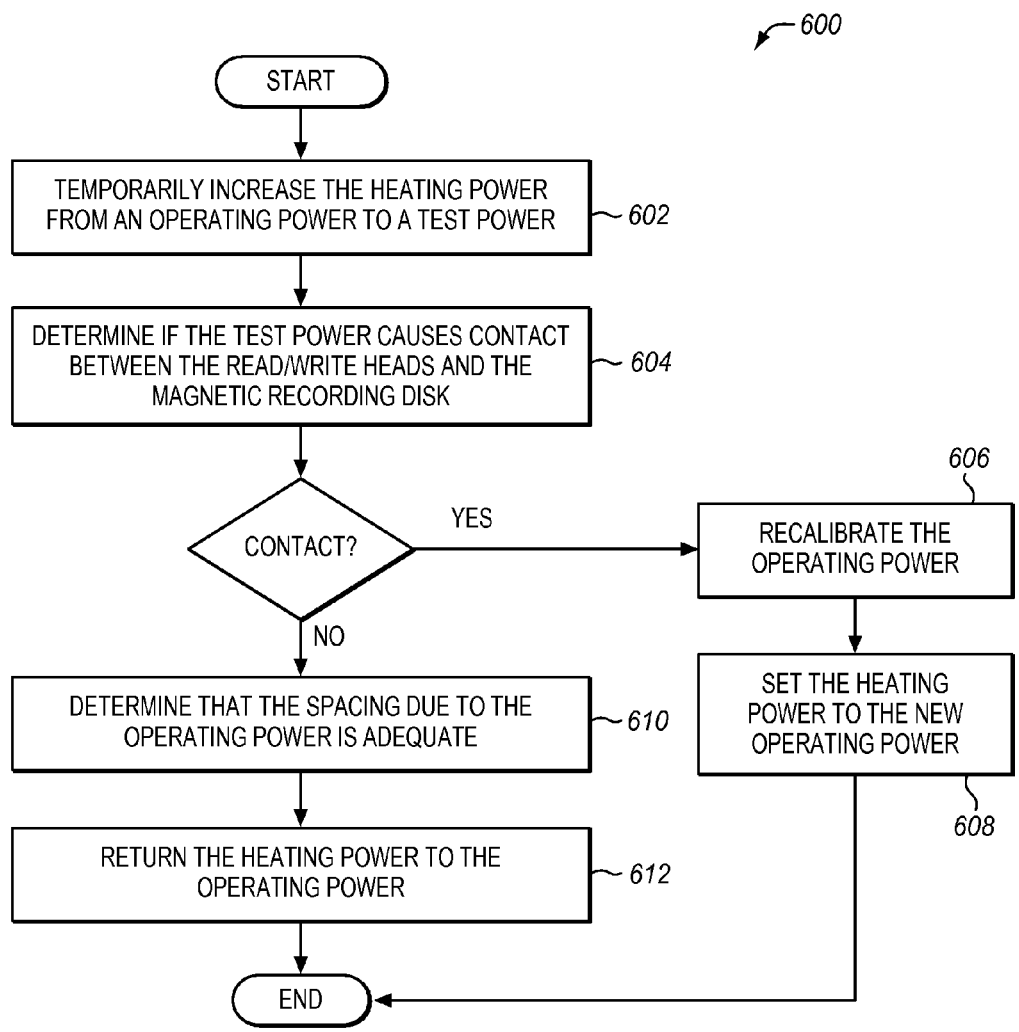
FIG. 6 is a flow chart illustrating a method of verifying the spacing between the read/write heads and a magnetic recording disk in an exemplary embodiment of the invention.

FIG. 6 is a flow chart illustrating a method 600 of verifying calibrated spacing 502 in an exemplary embodiment of the invention. Method 600 will be discussed in relation to the magnetic disk drive system 100 shown in FIGS. 1-5, and FIG. 7. The steps of the flow chart in FIG. 6 are not all inclusive and may include other steps not shown.

Figure 7:
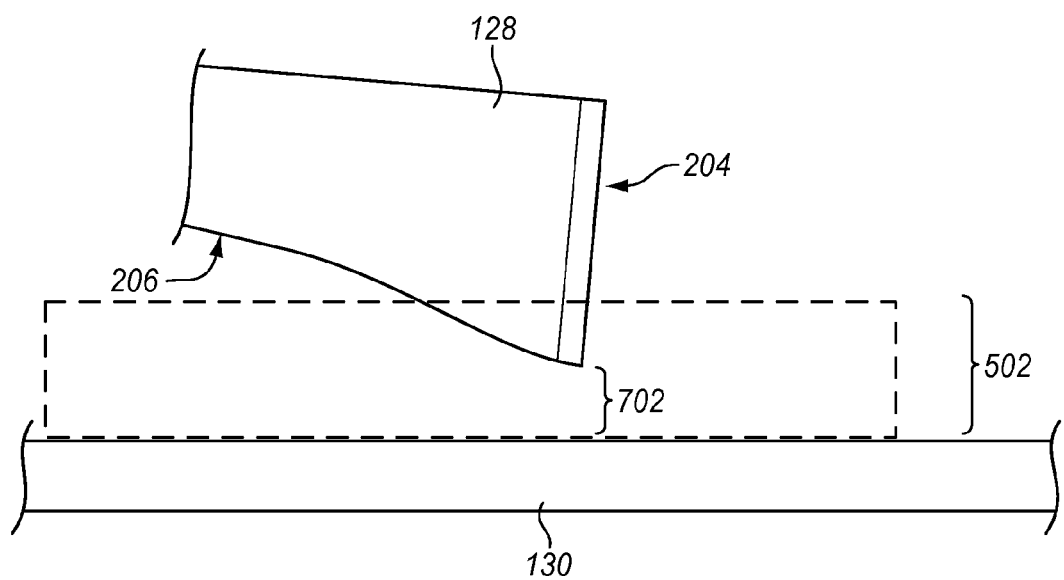
FIG. 7 is a side view of a slider in relation to a magnetic recording disk in an exemplary embodiment of the invention.

In step 602, thermal fly height controller 108 temporarily increases heating power 120 (see FIG. 1) from the operating power to a test power. As heating power 120 is increased, the spacing between the ABS of the read/write heads and magnetic recording disk 130 will decrease. FIG. 7 is another side view of slider 128 which shows test spacing 702 as a result of the test power applied to the heating elements in slider 128 in step 602.

In some cases, it may be desirable for test spacing 702 to be between 50% and 90% of calibrated spacing 502. For example, if calibrated spacing 502 is estimated to be about 6 nm when an operating power of 40 mW is applied, test spacing 702 when a test power is applied may be desired to be about 3 nm. One method for determining the test power is to calculate the difference between the operating power and the contact power previously determined. For example, if the contact power is 100 mW, and the operating power is 40 mW, then test spacing 702 may be determined to be about 50% of the difference between the contact power and the operating power, or about 70 mW.

In step 604, contact detection system 110 determines if the test power applied in step 602 causes contact between the read/write heads and magnetic recording disk 130. If contact is not detected, then calibration controller 104 determines that the spacing due to the operating power is adequate in step 610. The spacing is adequate because in this case changing the spacing from calibrated spacing 502 to test spacing 702 did not cause contact. This indicates to calibration controller 104 that calibrated spacing 502 has remained substantially the same since the last calibration. In step 612, thermal fly height controller 108 returns heating power 120 to the operating power.

If contact is detected, then calibration controller 104 recalibrates the operating power in step 606. Because contact has occurred, calibrated spacing 502 has not remained substantially the same since the last calibration. This may occur due to environmental changes or changes in magnetic disk drive system 100 over time. To recalibrate the operating power, calibration controller 104 may record the test power used in step 602 as a new contact power. Based on the new contact power and the spacing 302 (see FIG. 3) which occurs when no heating power is applied, calibration controller 104 may determine a new relationship between the heating power applied to the heating elements of slider 128 and the spacing between the read/write heads and magnetic recording disk 130. Using the new relationship, calibration controller 104 may calculate a new operating power to result in a new calibrated spacing 502, and may record the new operating power. In step 608, thermal fly height controller 108 sets heating power 120 to the new operating power.

In some cases it might be advantageous to perform method 600 periodically, for example, every 5 minutes while magnetic disk drive system 100 is in operation. In other cases it may be advantageous to perform method 600 when magnetic disk drive system 100 powers on, or when contact detection system 110 detects contact while not performing method 600.

It may also be advantageous to perform additional tests after performing method 600. For example, if the operating power is recalibrated as in step 606, it may be desirable to verify that the spacing due to the new operating power is adequate for reading and writing to magnetic recording disk 130. One method to perform this may entail writing a known test pattern to a free sector on magnetic recording disk 130 using write controller 114, and then reading the known test pattern back from the free sector using read controller 112. Control system 102 may then determine from the quality of the read test pattern (e.g., amplitude or bit errors in the read test pattern), that the calibrated spacing 502 resulting from the new operating power is adequate for reading and writing to magnetic recording disk 130.

Although specific embodiments were described herein, the scope of the invention is not limited to those specific embodiments. The scope of the invention is defined by the following claims and any equivalents thereof.

We claim:

1. A method of verifying a spacing between read/write heads on a slider and a magnetic recording disk within a magnetic disk drive system in end-user operation, wherein an operating power that is determined during calibration of the magnetic disk drive system is applied to heating elements in the slider to control the spacing between the read/write heads and the magnetic recording disk, the method comprising:
    temporarily increasing the operating power to a test power while in end-user operation to reduce the spacing between the read/write heads and the magnetic recording disk by:
    calculating a difference between a contact power and the operating power; and
    increasing the operating power by 50% to 90% of the calculated difference to the test power;
    determining if the test power causes contact between the read/write heads and the magnetic recording disk; and
    if contact is not detected, then determining that the spacing due to the operating power is acceptable for end-user operation.

2. The method of claim 1 wherein if contact is detected, then recalibrating the operating power.

3. The method of claim 2 wherein recalibrating the operating power comprises:
    recording the test power as a new contact power; and
    calculating a new operating power based on the new contact power.

4. The method of claim 2 further comprising:
    writing a known test pattern on a free sector of the magnetic recording disk;
    reading the known test pattern from the free sector; and
    determining from a quality of the read test pattern that the spacing due to the new operating power is acceptable for end-user operation.

5. The method of claim 1 wherein the method is performed periodically.

6. The method of claim 1 wherein the method is performed when the magnetic disk drive system is powered on.

7. A control system adapted to verify a spacing between read/write heads on a slider and a magnetic recording disk within a magnetic disk drive system in end-user operation, wherein an operating power that is determined during calibration of the magnetic disk drive system is applied to heating elements in the slider to control the spacing between the read/write heads and the magnetic recording disk, the control system comprising:

a thermal fly height controller adapted to calculate a difference between a contact power and the operating power, and to temporarily increase the operating power by 50% to 90% of the calculated difference to a test power while in end-user operation;

a contact detection system adapted to determine if the test power causes contact between the read/write heads and the magnetic disk; and a calibration controller adapted to determine that the spacing due to the operating power is acceptable for end-user operation if contact is not detected by the contact detection system.

8. The control system of claim 7 wherein the calibration controller is further adapted to:

recalibrate the operating power if contact is detected by the contact detection system.

9. The control system of claim 8 wherein the calibration controller, to recalibrate the operating power, is further adapted to:

record the test power as a new contact power; and calculate a new operating power based on the new contact power.

10. The control system of claim 8 further comprising:

a write controller adapted to write a known test pattern on a free sector of the magnetic recording disk; and a read controller adapted to read the known test pattern from the free sector;

the calibration controller further adapted to:

determine from a quality of the read test pattern that the spacing due to the new operating power is acceptable for end-user operation.

11. The control system of claim 7 wherein the thermal fly height controller is further adapted to:

temporarily increase the operating power to the test power periodically.

12. The control system of claim 7 wherein the thermal fly height controller is further adapted to:

temporarily increase the operating power to the test power when the magnetic disk drive system is powered on.

13. A magnetic disk drive system comprising:

a magnetic recording disk;

a slider including read/write heads and heating elements proximate to the read/write heads; and a control system adapted to apply an operating power that is determined during calibration of the magnetic disk drive system to the heating elements in the slider to control a spacing between the read/write heads and the magnetic recording disk;

the control system further adapted to:

calculate a difference between the contact power and the operating power;

temporarily increase the operating power by 50% to 90% of the calculated difference to a test power while in end-user operation to reduce the spacing between the read/write heads and the magnetic recording disk;

determine if the test power causes contact between the read/write heads and the magnetic recording disk; and determine that the spacing due to the operating power is acceptable for end-user operation if contact is not detected.

14. The magnetic disk drive system of claim 13 wherein the control system is further adapted to:

recalibrate the operating power if contact is detected.

15. The magnetic disk drive system of claim 14 wherein the control system, to recalibrate the operating power, is further adapted to:

record the test power as a new contact power; and calculate a new operating power based on the new contact power.

16. The magnetic disk drive system of claim 13 wherein the control system is further adapted to:

write a known test pattern on a free sector of the magnetic recording disk;

read the known test pattern from the free sector; and determine from a quality of the read test pattern that the spacing due to the new operating power is acceptable for end-user operation.

17. The magnetic disk drive system of claim 13 wherein the control system is further adapted to:

temporarily increase the operating power to the test power periodically.

18. The magnetic disk drive system of claim 13 wherein the control system is further adapted to:

temporarily increase the operating power to the test power when the magnetic disk drive system is powered on.

* * * * *